US009406140B2

(12) United States Patent
Lee et al.

(10) Patent No.: US 9,406,140 B2
(45) Date of Patent: Aug. 2, 2016

(54) METHOD AND APPARATUS FOR GENERATING DEPTH INFORMATION

(71) Applicant: Altek Semiconductor Corp., Hsinchu (TW)

(72) Inventors: Yun-Chin Lee, New Taipei (TW); Chia-Chun Tseng, Hsinchu (TW); Yu-Chia Chung, Taipei (TW)

(73) Assignee: Altek Semiconductor Corp., Hsinchu (TW)

( * ) Notice: Subject to any disclaimer, the term of this patent is extended or adjusted under 35 U.S.C. 154(b) by 72 days.

(21) Appl. No.: 14/307,506

(22) Filed: Jun. 18, 2014

(65) Prior Publication Data

US 2015/0302595 A1   Oct. 22, 2015

(30) Foreign Application Priority Data

Apr. 17, 2014  (TW) .............................. 103114050 A

(51) Int. Cl.
*G06T 7/00* (2006.01)
*H04N 13/00* (2006.01)
*G06T 5/00* (2006.01)

(52) U.S. Cl.
CPC ............... *G06T 7/0075* (2013.01); *G06T 5/005* (2013.01); *G06T 7/0081* (2013.01); *H04N 13/0018* (2013.01); *G06T 2207/10012* (2013.01)

(58) Field of Classification Search
None
See application file for complete search history.

(56) References Cited

U.S. PATENT DOCUMENTS

| | | | |
|---|---|---|---|
| 8,280,149 B2 | 10/2012 | Yu et al. | |
| 8,655,093 B2 | 2/2014 | El Dokor et al. | |
| 2010/0266189 A1 | 10/2010 | Knapp et al. | |
| 2011/0001799 A1* | 1/2011 | Rothenberger | ....... G06T 7/0051 348/47 |
| 2011/0019922 A1* | 1/2011 | Hue | ................... G06K 9/00791 382/199 |
| 2012/0113117 A1* | 5/2012 | Nakayama | ............ G06T 7/0051 345/420 |
| 2013/0113881 A1* | 5/2013 | Barnum | ............. H04N 13/0018 348/43 |
| 2013/0136338 A1* | 5/2013 | Asente | .................... G06K 9/46 382/154 |
| 2014/0118335 A1* | 5/2014 | Gurman | ................ G06T 7/0042 345/419 |
| 2014/0198977 A1* | 7/2014 | Narasimha | .............. G06T 5/007 382/154 |

OTHER PUBLICATIONS

Dorea et al, "Depth Map Reconstruction Using Color-Based Region Merging," 2011, Image Processing (ICIP), 18th IEEE International Conference on, pp. 1-4.*
Hojjatoleslami et al, "Region Growing: A New Approach," 1998, IEEE Transactions on Image Processing. vol. 7, No. 7, pp. 1079-1084.*

* cited by examiner

*Primary Examiner* — David F Dunphy
(74) *Attorney, Agent, or Firm* — Jianq Chyun IP Office

(57) ABSTRACT

A method and an apparatus for generating depth information are provided. A main depth map associated with one of a left image and a right image and corresponding to multiple first pixels is obtained. The left image or the right image associated with the main depth map is divided into multiple segments according to pixel information, so as to obtain a segment distribution map including the segments. Multiple invalid depth values which do not match to a reliable condition are removed from the main depth map according to the segment distribution map, so as to generate a necessary repair depth map including multiple holes. Multiple optimized depth values are respectively generated for the holes in the necessary repair depth map according to the segment distribution map, and the optimized depth values are filled into the necessary repair depth map to generate an optimized depth map.

20 Claims, 11 Drawing Sheets

METHOD AND APPARATUS FOR GENERATING DEPTH INFORMATION

CROSS-REFERENCE TO RELATED APPLICATION

This application claims the priority benefit of Taiwan application serial no. 103114050, filed on Apr. 17, 2014. The entirety of the above-mentioned patent application is hereby incorporated by reference herein and made a part of this specification.

FIELD OF THE INVENTION

This invention relates to a method and an apparatus for image processing and more particularly, to a method and an apparatus for generating depth information.

DESCRIPTION OF RELATED ART

As image processing technology develops and thrives, stereo vision has been gradually and widely applied to a variety of fields. The stereo vision in broad terms can include two stages. In the former stage, depth information is generated by using a depth camera, a stereo camera or a method, such as a three-dimension (3D) imaging algorithm, and in the later stage, images in different vision angles are generated according to the depth information. Accordingly, in order to generate a 3D image with better visual perception, accurate depth information plays a very important role.

As for a stereoscopic imaging system having dual lenses, images in different angles related to one scene can be captured by using the dual lenses of the stereoscopic imaging system, and depth information of each object in the images may be estimated according to information of pixel difference between images captured by the left and the right lenses and distance between the two lenses. Generally, the depth information can be represented in a depth map, and depths of different objects or pixels in a two-dimensional (2D) image are represented by using depth values recorded on the depth map. Therein, a depth generation algorithm based on local-correlation and pixel-wise matching is common to the stereoscopic imaging systems having dual lenses.

However, a depth map generated based on the local-correlation may have an edge blur issue, while the pixel-wise matching method may also lead to significant calculation and great consumption in memory resources. In other words, different algorithms for generating the depth information have different accuracies and calculation amounts. Therefore, how to generate accurate depth information under a condition with a permissible calculation amount and complexity as well as to enhance quality of the 3D image generated according to the depth information has been an important goal to be achieved by the persons skilled in the field.

SUMMARY

Accordingly, the invention provides a method and an apparatus for generating depth information capable of reducing noise in the depth information and enhancing accuracy of the depth information, such that a three-dimensional (3D) image produced by a stereoscopic imaging system can provide a better visual experience.

The invention provides a method for generating depth information for an electronic apparatus. The method includes the following steps. First, a left image and a right image captured by a stereoscopic imaging system are obtained. Three-dimensional (3D) depth estimation is performed on the left image and the right image so as to obtain a main depth map associated with one of the left image and the right image and corresponding to a plurality of first pixels. The main depth map records a plurality of main depth values respectively corresponding to the first pixels. According to pixel information of each of the first pixels, the left image or the right image associated with the main depth map is divided into a plurality of segments, so as to obtain a segment distribution map including the segments. Whether the main depth values corresponding to the first pixels match a reliable condition is determined according to the segment distribution map. A plurality of invalid depth values among the main depth values which do not match the reliable condition are removed from the main depth map, so as to generate the necessary repair depth map including a plurality of third holes among the holes. A plurality of optimized depth values are generated respectively for the holes in the necessary repair depth map according to the segment distribution map, and the optimized depth values are filled into the necessary repair depth map to generate an optimized depth map.

In an embodiment of the invention, the step of dividing the left image or the right image associated with the main depth map into the segments according to the pixel information of each of the first pixels so as to obtain the segment distribution map including the segments includes the following steps. A first adjacent pixel and a second adjacent pixel that are adjacent to each other among the first pixels are compared to determine whether a pixel value difference between the first adjacent pixel and the second adjacent pixel is less than a difference threshold. If the pixel value difference is less than the difference threshold, the first adjacent pixel and the second adjacent pixel are connected with each other to form a first segment among the segments. The first segment at least includes the first adjacent pixel and the second adjacent pixel.

In an embodiment of the invention, the step of dividing the left image or the right image associated with the main depth map into the segments according to the pixel information of each of the first pixels so as to obtain the segment distribution map including the segments further includes the following steps. A segment size of each of the segments is limited according to a size threshold to obtain the segment distribution map. The segment size of each of the segments is not greater than the size threshold.

In an embodiment of the invention, the step of determining whether the main depth values corresponding to the first pixels match the reliable condition according to the segment distribution map and removing the invalid depth values among the main depth values which do not match the reliable condition from the main depth map so as to generate the necessary repair depth map including multiple holes includes the following steps. The main depth map is divided into a plurality of depth segments according to the segment distribution map, and a statistical calculation is performed on the main depth values in each of the depth segments to obtain a statistical result. Whether the main depth values are a plurality of first invalid depth values among the invalid depth values is determined according to the statistical result, and the first invalid depth values is removed from the main depth map, so as to generate the necessary repair depth map including a plurality of first holes among the holes.

In an embodiment of the invention, after the step of removing the first invalid depth values from the main depth map so as to generate the necessary repair depth map including the first holes among the holes, the method further includes the following steps. A plurality of invalid density values of the first invalid depth values within a limited range is respectively calculated by using a plurality of first valid depth values which are not the first invalid depth values among the main depth values as centers. Whether the first valid depth values are a plurality of second invalid depth values among the invalid depth values respectively is determined according to whether the invalid density values are greater than a density threshold. The second invalid depth values are removed from the main depth map, so as to generate the necessary repair depth map including a plurality of second holes among the holes.

According to an embodiment of the present invention, the method further includes the following steps. The 3D depth estimation is performed on the left image and the right image so as to obtain an auxiliary depth map associated with the other of the left image and the right image and corresponding to a plurality of second pixels. The auxiliary depth map records an auxiliary depth value of each of the second pixels. The auxiliary depth map and the main depth map are compared to remove the main depth values which are not consistent with the corresponding auxiliary depth values thereof from the main depth map, so as to generate the necessary repair depth map including a plurality of third holes among the holes.

In an embodiment of the invention, the segment distribution map has a segmentation fineness according to the difference threshold and the size threshold. The segment distribution map includes a first segment distribution map and a second segment distribution map, and the segmentation fineness of the first segment distribution map is different from the segmentation fineness of the second segment distribution map.

In an embodiment of the invention, the step of generating the optimized depth values respectively for the holes in the necessary repair depth map according to the segment distribution map and filling the optimized depth values into the necessary repair depth map to generate the optimized depth map includes the following steps. The necessary repair depth map is divided into a plurality of first depth segments according to the first segment distribution map, and a first valid density value is obtained according to the number of the holes in each of the first depth segments. Whether to calculate a first average depth value of each of the first depth segments is determined according to the first valid density value, and part of the holes are filled by using the first average depth value as one of the optimized depth values. The preceding two steps are repeated until the times of repeating the preceding two steps reach a predetermined number.

In an embodiment of the invention, the step of determining whether to calculate the first average depth value of each of the first depth segments according to the first valid density value includes the following step. Whether to calculate the first average depth value of each of the first depth segments is determined according to whether the first valid density value is greater than a valid threshold.

In an embodiment of the invention, the step of determining whether to calculate the first average depth value of each of the first depth segments according to the first valid density value further includes the following steps. A processing sequence of each of the first depth segments is obtained according to the first valid density value of each of the first depth segments, and whether to fill the holes in each of the first depth segments is determined according to whether the processing sequence has a high priority.

In an embodiment of the invention, after the step of determining whether to calculate the first average depth value of each of the first depth segments according to the first valid density value and filling part of the holes by using the first average depth value as one of the optimized depth values, the method further includes the following steps. The necessary repair depth map is divided into a plurality of second depth segments according to the second segment distribution map, and a second valid density value is obtained according to the number of the holes in each of the second depth segments, whether to calculate a second average depth value of each of the second depth segments is determined according to the second valid density value, and part of the holes are filled by using the second average depth value as one of the optimized depth values.

In another aspect, the invention provides an apparatus for generating depth information, which includes a storage unit recording a plurality of modules and one or more processing units. The one or more processing units are coupled with the storage unit to access and execute the modules recorded in the storage unit. The modules include a depth estimation module, a segment distribution map obtaining module, an invalid depth removing module and a holes filling module. The depth estimation module obtains a left image and a right image captured by a stereoscopic imaging system and performs 3D depth estimation on the left image and the right image so as to obtain a main depth map associated with one of the left image and the right image and corresponding to a plurality of first pixels. The main depth map records a plurality of main depth values respectively corresponding to the first pixels. The segment distribution map obtaining module divides the left image or the right image associated with the main depth map into a plurality of segments according to pixel information of each of the first pixels, so as to obtain a segment distribution map including the segments. The invalid depth removing module determines whether the main depth values corresponding to the first pixels match a reliable condition according to the segment distribution map and removes a plurality of invalid depth values among the main depth values which do not match the reliable condition from the main depth map, so as to generate a necessary repair depth map including a plurality of holes. The holes filling module generates a plurality of optimized depth values respectively for the holes in the necessary repair depth map according to the segment distribution map and fills the optimized depth values into the necessary repair depth map to generate an optimized depth map.

To sum up, in the embodiments with respect to the generation of the depth information of the invention, the original left image or right image is divided according to the pixel information to generate the segment distribution map including the segments. The segment distribution map is then used to remove the invalid depth values from the depth map. Furthermore, in the invention, the invalid depth values in each of the segments can be removed through calculating the statistical information of the depth values included within each of the segments. Besides, filling processes of different stages can be performed by the dividing manners applied to the segments in different sizes, such that the holes in the depth map can be filled by using the optimized depth values generated in different stages. Thereby, not only the invalid depth values with low reliability can be removed from the depth map, but also the holes in the depth map can be filled by using the optimized depth values generated according to information with respect to the nearby depth values of each of the holes, so as to generate the depth map with less noise and high accuracy.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
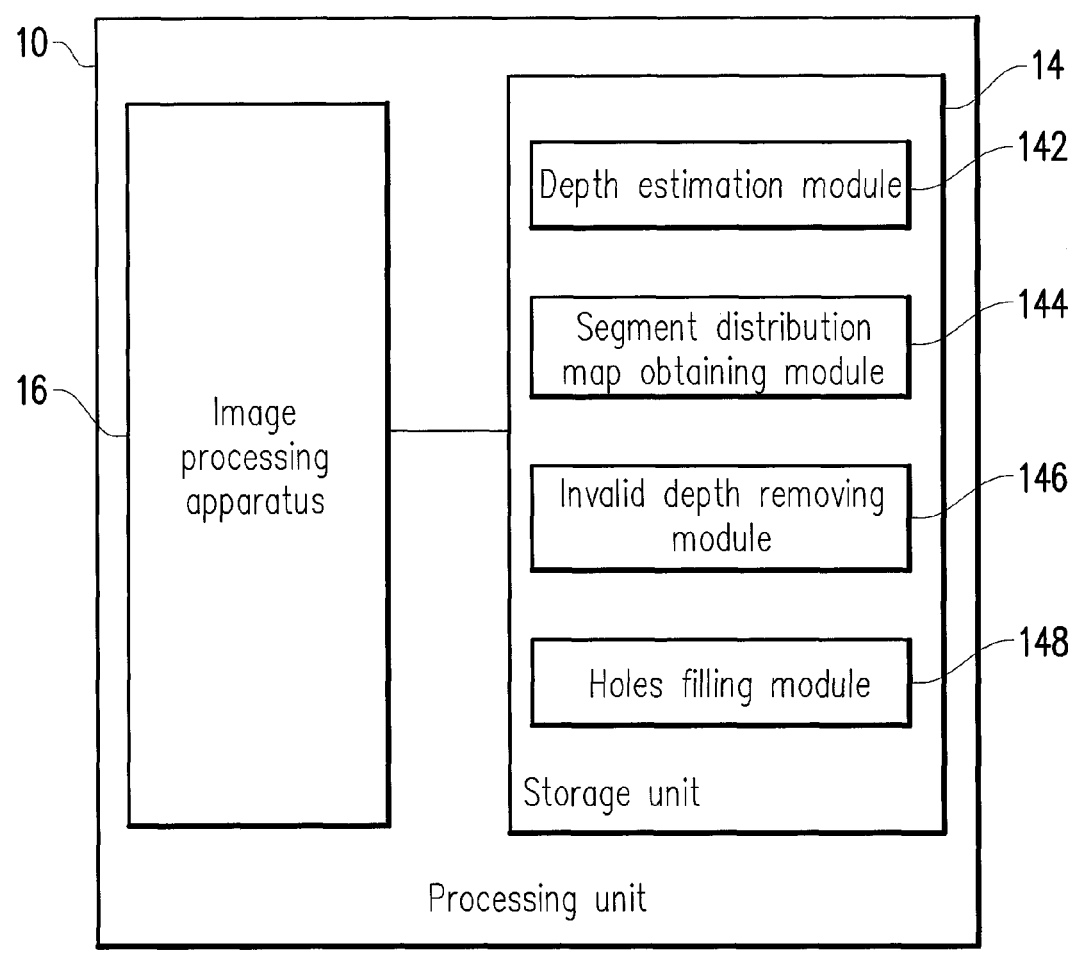
FIG. 1 is a block diagram illustrating an apparatus for generating depth information according to an embodiment of the invention.

FIG. 1 is a block diagram illustrating an apparatus for generating depth information according to an embodiment of the invention. With reference to FIG. 1, an image processing apparatus 10 of the present embodiment is, for example, a mobile phone, a tablet computer, a notebook computer or a stereoscopic camera including a stereoscopic imaging system (not shown), but the invention is not limited thereto. Namely, the image processing apparatus 10 may be an image capturing apparatus including the stereoscopic imaging system. Additionally, the image processing apparatus 10 may also be an electronic apparatus coupled with the image capturing apparatus having the stereoscopic imaging system, which is not limited in the invention. The image processing apparatus 10 includes a storage unit 14 and one or more processing units (only a processing unit 16 is illustrated for illustration, but the invention is not limited thereto), and functions thereof will be as below.

The storage unit 14 is, for example, a random access memory, a flash memory or any other memory for storing data and a plurality of modules. The modules includes a depth estimation module 142, a segment distribution map obtaining module 144, an invalid depth removing module 146 and holes filling module 148. The modules are, for example, programs which may be loaded into the processing unit 16 to execute a function for generating depth information. In other words, the processing unit 16 is coupled with the storage unit 14 and serves to execute the modules, so as to control the image processing apparatus 10 to execute the function for generating the depth information. The processing unit 16 may be, for example, a central processing unit (CPU), a microprocessor, an application specific integrated circuits (ASIC), a programmable logic device (PLD) or any other hardware device having computing capability.

Figure 2:
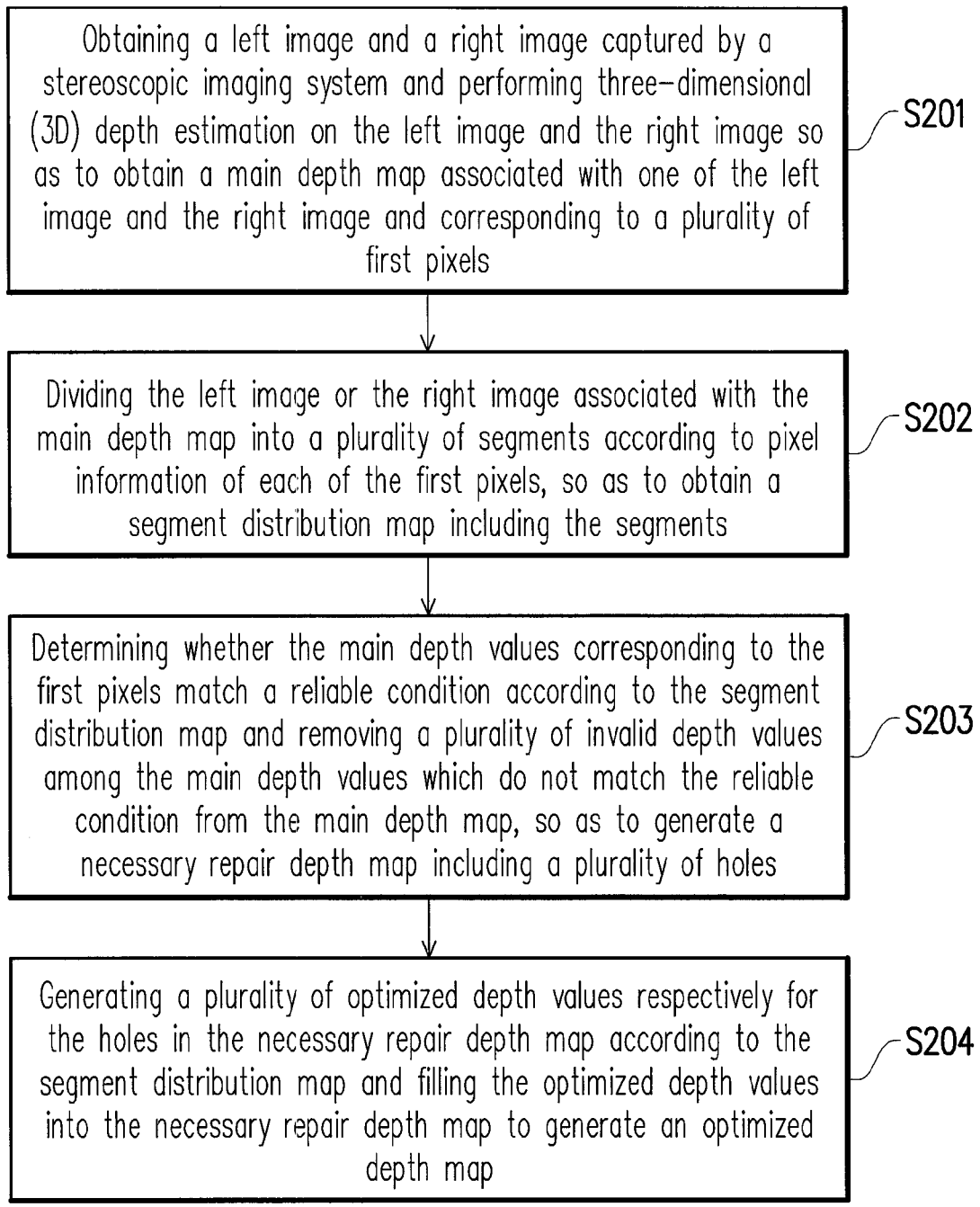
FIG. 2 is a flowchart illustrating a method for generating depth information according to an embodiment of the invention.

FIG. 2 is a flowchart illustrating a method for generating depth information according to an embodiment of the invention. With reference to FIG. 2, the method of the present embodiment is suitable for the image processing apparatus 10 of FIG. 1. Detailed steps of the method for generating the depth information operated by using each element of the image processing apparatus 10 will be described below.

First, the depth estimation module 142 obtains a left image and a right image captured by a stereoscopic imaging system and performs three-dimensional (3D) depth estimation on the left image and the right image, so as to obtain a main depth map associated with one of the left image and the right image and corresponding to multiple first pixels (step S201). The main depth map records a plurality of main depth values respectively corresponding to the first pixels. Furthermore, in an embodiment, the stereoscopic imaging system includes two image sensing modules. The two image sensing modules may classified into a left image sensing module and a right image sensing module according to positions where their lenses are disposed. Accordingly, when a user presses a shutter button or issues a capturing command, the left image sensing module and the right image sensing module captures images (i.e., the left image and the right image) in different angles for the same scene.

In detail, the left image includes a plurality of left pixels, and the right image includes a plurality of right pixels. The depth estimation module 142 calculates a pixel difference between each left pixel on the left image and each right pixel on the right image that are corresponding to each other. The pixel difference is a displacement between the left pixel on the left image and the right pixel on the right image that are corresponding to each other. Accordingly, the depth estimation module 142 may estimates a depth value of each left pixel on the left image and a depth value of each right pixel on the right image according to focal lengths for the left lens and the right lens to capture the left image and the right image, distance between the two lenses, and the pixel difference between the corresponding left and right pixels. That is, the depth estimation module 142 may obtain a left depth map based on the left image and a right depth map based on the right image.

It should be mentioned that the main depth map of the present embodiment may be a left depth map based on the left image or the right depth map based on the right image, which is not limited in the invention. Namely, when the main depth map is the left depth map based on the left image, the main depth map records a plurality of main depth values respectively corresponding to the left pixels. When the main depth map is the right depth map based on the right image, the main depth map records a plurality of main depth values respectively corresponding to the right pixels.

Returning to the process illustrated in FIG. 2, the segment distribution map obtaining module 144 divides the left image or the right image associated with the main depth map into a plurality of segments according to pixel information of each of the first pixels, so as to obtain a segment distribution map including the segments (step S202). That is, when the main depth map is the left depth map, the segment distribution map obtaining module 144 divides the left image into a plurality of segments according to the pixel information of each of the left pixels, so as to obtain the segment distribution map including the segments. On the other hand, when the main depth map is the right depth map, the segment distribution map obtaining module 144 divides the right image into a plurality of segments according to the pixel information of each of the right pixels, so as to obtain the segment distribution map including the segments.

In an embodiment, the segment distribution map obtaining module 144 compares a first adjacent pixel with a second adjacent pixel that are adjacent to each other among the right pixels (or the right pixels) to determine whether a pixel value difference between the first adjacent pixel and the second adjacent pixel is less than a difference threshold. In this case, the pixel value difference is produced by a pixel value of the first adjacent pixel subtracting a pixel value of the second adjacent pixel. If the pixel value difference is less than the difference threshold, the segment distribution map obtaining module 144 connects the first adjacent pixel with the second adjacent pixel to form a first segment among the segments. The first segment at least includes the first adjacent pixel and the second adjacent pixel.

In particular, when the main depth map is the left depth map, the segment distribution map obtaining module 144 may obtain the pixel value of each of the left pixels by, for example, calculating a color parameter of each of the left pixels, so as to generate the segment distribution map by using the pixel values as the pixel information. For example, the segment distribution map obtaining module 144 may obtain the pixel values of the left pixels in different chrominance channels by calculating red, green and blue (RGB) chrominance components of the left pixels. Similarly, the segment distribution map obtaining module 144 may also obtain the pixel values of the left pixels in brightness or chrominance channels by calculating a brightness (Y) and a chrominance component (Cb,Cr) of each of the left pixels.

Thereby, the segment distribution map obtaining module 144 may generate the pixel value difference by comparing pixel values of the adjacent pixels and determine whether to connect the adjacent pixels with each other according to the pixel value difference between the adjacent pixels. If the pixel value difference is less than the difference threshold, the adjacent pixels are grouped into the same segment. In other words, the left image is divided into individual segments according to color performance of each of the left pixels, and the left pixels within the same segment have the similar color performance.

Figure 3A:
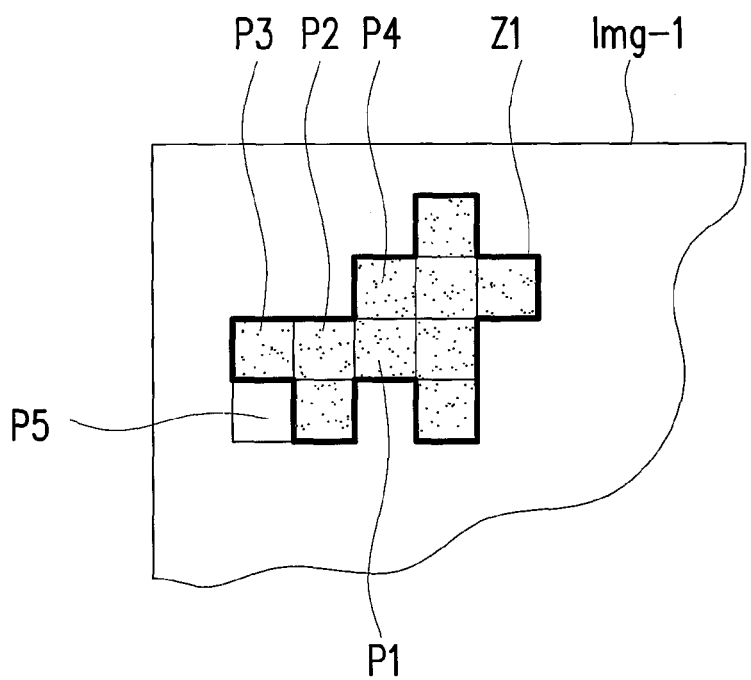
FIG. 3A is a schematic diagram illustrating an example of dividing the left image or the right image.

For example, FIG. 3A is a schematic diagram illustrating an example of dividing the left image or the right image. With reference to FIG. 3A, it is assumed that an image Img_1 includes pixels P1 to P5. In the present example, the segment distribution map obtaining module 144 first serves the pixel P1 as a datum point and calculates a pixel value of the pixel P1. Then, the segment distribution map obtaining module 144 first compares the pixel value of the pixel P1 with pixel values of the other pixels therearound. As shown in FIG. 3A, a pixel value difference between the pixels P1 and P2 is less than the difference threshold, and thus, the segment distribution map obtaining module 144 connects the pixel P1 with the pixel P2. Similarly, a pixel value difference between the pixels P1 and P4 is less than the difference threshold, and thus, the segment distribution map obtaining module 144 connects the pixel P1 with the pixel P4.

Further, a pixel value difference between the pixels P2 and P3 is less than the difference threshold, and thus, the segment distribution map obtaining module 144 connects the pixel P2 with the pixel P3. In contrast, a pixel value difference between the pixels P3 and P5 is greater than the difference threshold, and thus, the segment distribution map obtaining module 144 does not connect the pixel P3 with the pixel P5, and the pixel P5 is not grouped into a segment z1. In brief, by means of comparing the pixel values of the adjacent pixels, the segment distribution map 144 may obtain the segment z1 formed by using the pixel P1 as the center datum point, and the color performance of each pixel within the segment z1 is similar to that of the pixel P1.

Sequentially, according to the position and the pixel value of each pixel, the image Img_1 is divided into a plurality of segments, and the segment distribution map obtaining module 144 also obtains a segment distribution map including the segments. Accordingly, a segment size of coverage of each of the segments is increased with the increase of the difference threshold. In an embodiment, the segment distribution map obtaining module 144 may limit the segment size of each of the segments according to a size threshold to obtain the segment distribution map. Therein, the segment size of each of the segments is not greater than the size threshold, and the segment size of coverage each of the segments is increased with the increase of the difference threshold. In general, the segment distribution map obtaining module 144 may determine a segmentation fineness of the segment distribution map based on the settings of the difference threshold and the size threshold.

Figure 3B:
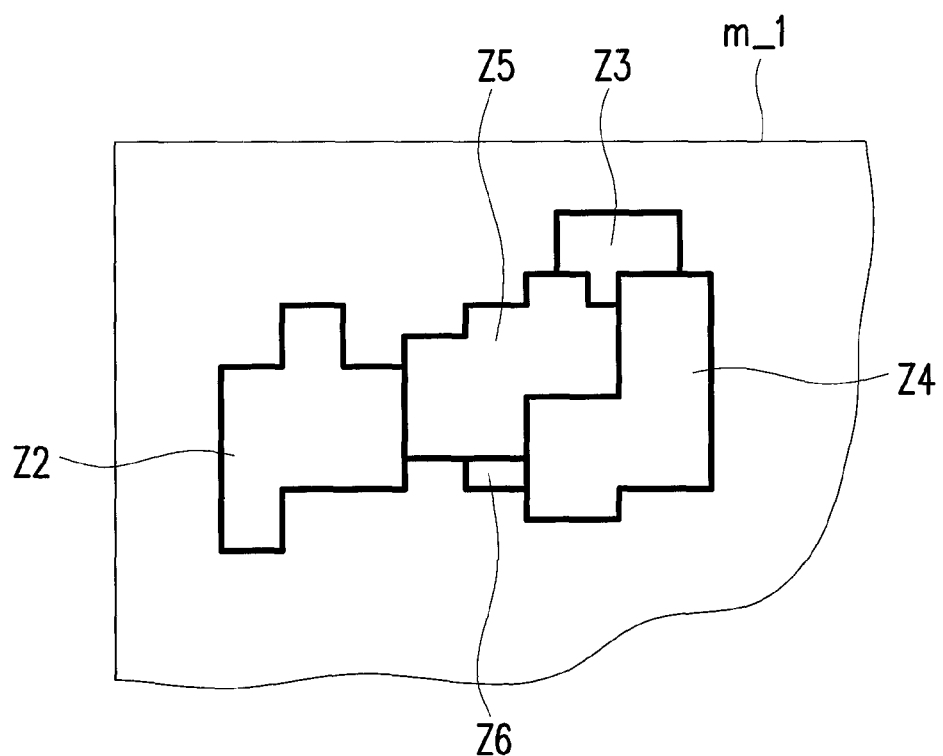
FIG. 3B is an exemplary schematic diagram illustrating an example of a part of the segment distribution map.

That is, after determining a value of the difference threshold, a manner for setting the center datum point and a value of the size threshold, the segment distribution map obtaining module 144 may obtains a segment distribution map with a specific segmentation fineness by dividing the image into a plurality of segments. For example, FIG. 3B is an exemplary schematic diagram illustrating an example of a part of the segment distribution map. With reference to FIG. 3B, a segment distribution map m_1 includes a plurality of segments z2 to z6, and areas covered by the segments z2 to z6 have different sizes and shapes, but the invention is not limited thereto. Persons with ordinary skills of the art may determine the value of the difference threshold, the manner for setting the center datum point and the value of the size threshold according to actual requirements, which will not be repeatedly described hereinafter.

Back to the process illustrated in FIG. 2, the invalid depth removing module 146 determines whether the main depth values corresponding to the first pixels match a reliable condition according to the segment distribution map and removes a plurality of invalid depth values among the main depth values which do not match the reliable condition from the main depth map, so as to generate a necessary repair depth map including a plurality of holes (step S203). In particular, the invalid depth removing module 146 may obtain neighboring depth information around each of the main depth values according to the segment distribution map and determines whether each of the main depth values matches the reliable condition according to the other depth information around each of the main depth values, so as to remove the main depth values which are considered as the invalid depth values from the main depth map, so as to generate the necessary repair depth map.

Then, the holes filling module 148 generates a plurality of optimized depth values respectively for the holes in the necessary repair depth map according to the segment distribution map and fills the optimized depth values into the necessary repair depth map to generate an optimized depth map (step S204). In detail, the segment distribution map is obtained according to a level of similarity of the pixels and a positional relation among the pixels, and thus, the pixels within the same segment on the left image or the right image have a certain degree of relevance. Thereby, the invalid depth removing module 146 may divide the main depth map generated by the segment distribution map obtaining module 144 into a plurality of depth segments according to the segment distribution map, and the main depth values within the same depth segment should also have a certain degree of relevance.

Accordingly, based on the characteristic that the main depth values within the same depth segment have a certain degree of relevance, the invalid depth removing module 146 may determine whether each of the main depth values is the invalid depth value, and the holes filling module 148 fills the holes generated due to the invalid depth values being removed to generate better optimized depth values. Thereby, the image processing apparatus 10 of the present embodiment may further perform the optimization operation of the depth map by using the image content provided by the original left image or right image, so as to generate an optimized depth map with a higher accuracy.

Figure 4:
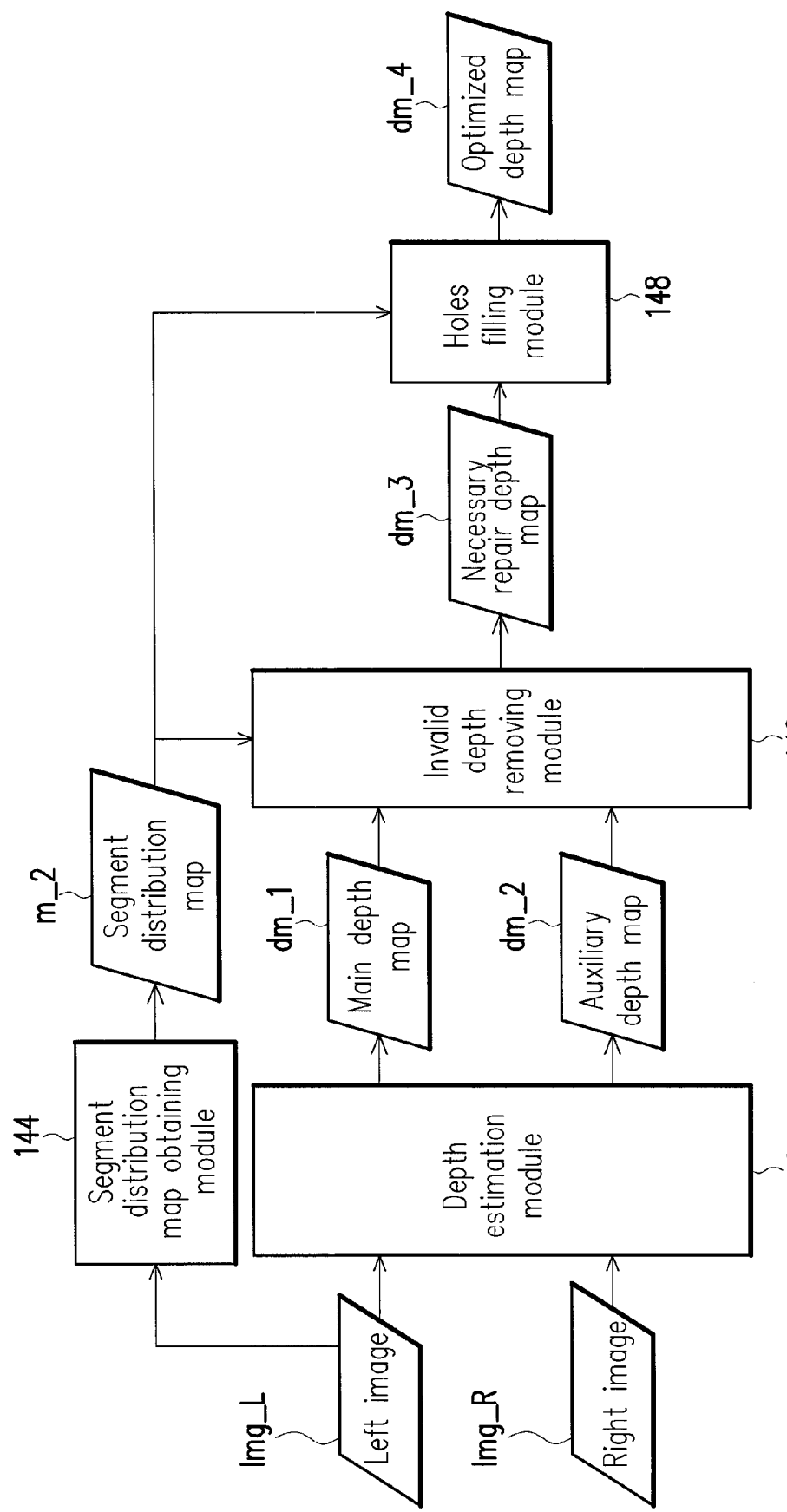
FIG. 4 is a schematic diagram illustrating the operation of the method for generating depth information according to an embodiment of the invention.

In order to describe the invention more clearly, FIG. 4 is a schematic diagram illustrating the operation of the method for generating depth information according to an embodiment of the invention. With reference to FIG. 4, the depth estimation module 142 obtains a left image Img_L and a right image Img_R captured by a stereoscopic imaging system and performs 3D depth estimation on the left image Img_L and the right image Img_R, so as to obtain a main depth map dm_1 and an auxiliary depth map dm_2. In the present embodiment, the main depth map dm_1 is, for example, a left depth map based on the left image Img_L, and the auxiliary depth map dm_2 is, for example, a right depth map based on the right image Img_R.

Accordingly, the segment distribution map obtaining module 144 divides the left image Img_L into a plurality of segments according to pixel information of the left image Img_L, so as to obtain a segment distribution map m_2 including the segments. The invalid depth removing module 146 digs holes on the main depth map dm_1 according to the segment distribution map m_2 and the auxiliary depth map dm_2, so as to generate a necessary repair depth map dm_3 including a plurality of holes. The holes filling module 148 generates a plurality of optimized depth values respectively for the holes in the necessary repair depth map dm_3 according to the segment distribution map m_2 and fills the optimized depth values into the necessary repair depth map dm_3 to generate an optimized depth map dm_4.

Figure 5:
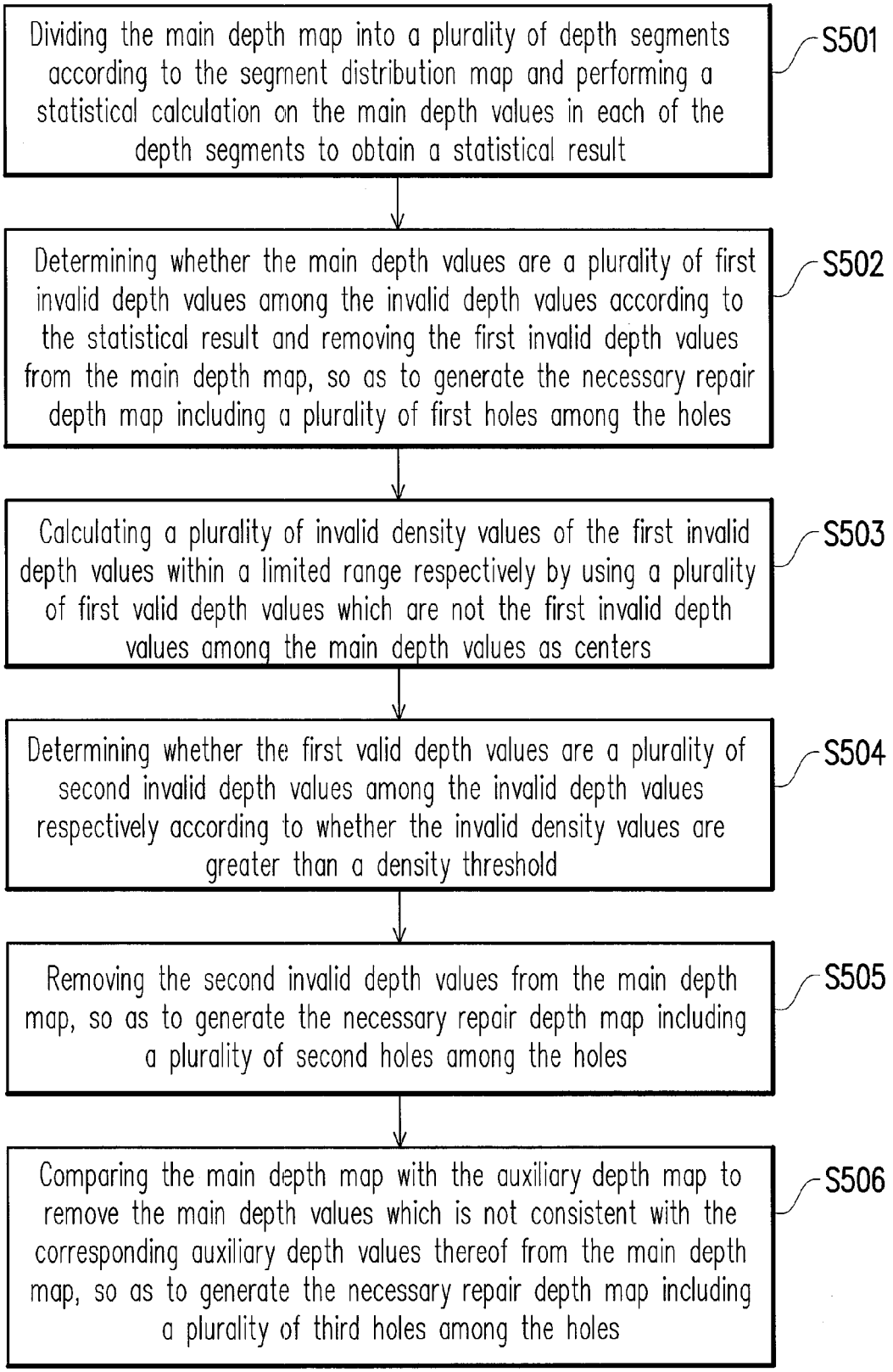
FIG. 5 is a flowchart illustrating a method for generating a necessary repair depth map according to an embodiment of the invention.

According to the preceding embodiments, the segment distribution map obtaining module 144 may obtain the segment distribution map m_2 having different segmenting manners according to different difference thresholds, size thresholds and manners for setting the datum point. Details with respect to the segment distribution map obtaining module 144 generating the segment distribution map m_2 has been described above and thus, will not be repeated hereinafter. Embodiments will provided below to describe in detail how the invalid depth removing module 146 and the holes filling module 148 remove the invalid depth values and generate the optimized depth values by using the segment distribution map m_2. FIG. 5 is a flowchart illustrating a method for generating a necessary repair depth map according to an embodiment of the invention, and detailed steps of the method for generating the necessary repair depth map of the present embodiment will be described with reference to FIG. 4.

Referring to both FIG. 4 and FIG. 5, the invalid depth removing module 146 divides the main depth map dm_1 into a plurality of depth segments according to the segment distribution map m_2 and performs a statistical calculation on the main depth values in each of the depth segments to obtain a statistical result (step S501). The statistical calculation may be, for example, an average calculation, a mode calculation, or a median calculation, which is not limited in the invention. For instance, the invalid depth removing module 146 may perform the average calculation on the main depth values in each of the depth segments to obtain an average depth value of each of the depth segments. Nevertheless, in other feasible embodiments, persons with ordinary skills of the art may select another appropriate statistical calculation method according actual demands, so as to determine whether the main depth values are valid depth values according to an appropriate statistical result, which is not repeatedly described hereinafter.

Then, the invalid depth removing module 146 determines whether the main depth values are a plurality of first invalid depth values among the invalid depth values according to the statistical result and removes the first invalid depth values from the main depth map dm_1, so as to generate the necessary repair depth map including a plurality of first holes among the holes (step S502). Namely, the invalid depth removing module 146 may determine whether the main depth values in each of the main depth segments include the first invalid depth values according to the statistical result and each of the first invalid depth values may be considered as invalid if having a great difference from the other main depth values within the same segment. Accordingly, the invalid depth removing module 146 removes the first invalid depth values from the main depth map dm_1 to generate first holes corresponding to the first invalid depth values.

Figure 6:
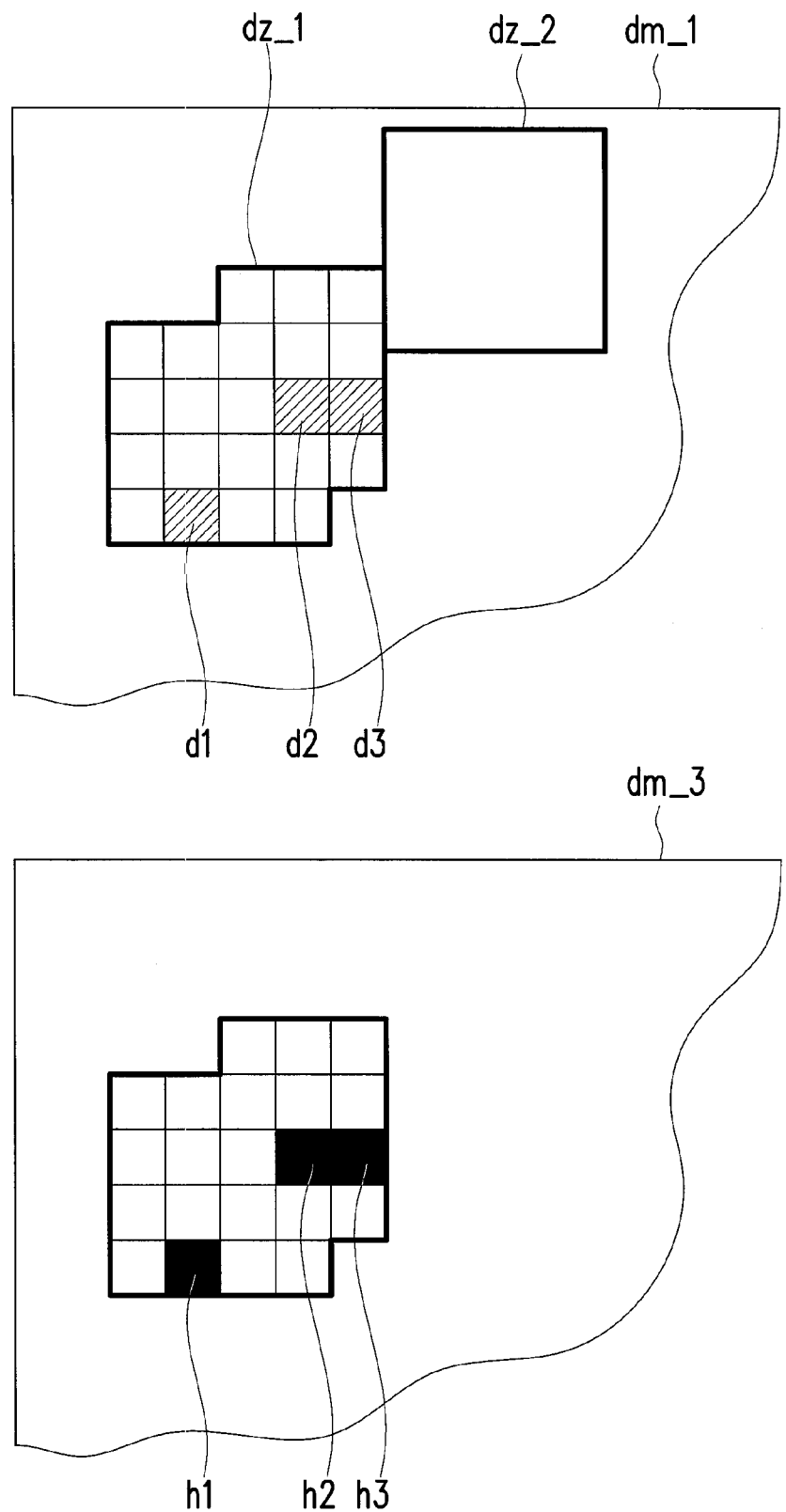
FIG. 6 is a schematic diagram illustrating an example of removing the invalid depth values according to a statistical result according to an embodiment of the invention.

For instance, FIG. 6 is a schematic diagram illustrating an example of removing the invalid depth values according to a statistical result according to an embodiment of the invention. With reference to FIG. 6, it is assumed that after being divided according to the segment distribution map m_2, the main depth map dm_1 may include a depth segment dz_1 and a depth segment dz_2. In the present example, the invalid depth removing module 146 may perform the average calculation on main depth values in the depth segment dz_1 to obtain an average depth value of the depth segment dz_1. Thus, the invalid depth removing module 146 may determine whether the main depth values in the depth segment dz_1 are the first invalid depth values according to the average depth value. In the present example, a main depth value d1 of the depth segment dz_1 has a significant difference from the average depth value of the depth segment dz_1, and thus, the main depth value d1 is determined as one first invalid depth value.

Similarly, main depth values d2 to d3 in the depth segment dz_1 are significantly different from the average depth value of the depth segment dz_1, and thus, the main depth values d2 to d3 are also determined as the first invalid depth values. Accordingly, the invalid depth removing module 146 removes the main depth value d1 considered as one first invalid depth value from the main depth map dm_1, so as to generate the necessary repair depth map dm_3 including a hole h1. Similarly, the invalid depth removing module 146 removes the main depth values d2 to d3 considered as the first invalid depth value from the main depth map dm_1, so as to generate the necessary repair depth map dm_3 respectively including holes h2 and h3.

It should be mentioned that after the processing of steps S501 and S502, a plurality of holes are generated on the necessary repair depth map dm_3 due to the first invalid depth values being removed. Accordingly, in the present embodiment, the invalid depth removing module 146 may determine a reliability degree of the main depth values according to a density of the invalid depth values around the unremoved valid depth values or a density of the valid depth values.

Thus, the invalid depth removing module 146 calculates a plurality of invalid density values of the first invalid depth values within a limited range respectively by using a plurality of first valid depth values which are not the first invalid depth values among the main depth values as centers (step S503). A size of the limited range may be determined according to actual application situations, which is not limited in the invention. For example, the size of the limited range may be 5×5 pixels, 10×10 pixels or the like.

Then the invalid depth removing module 146 determines whether the first valid depth values are respectively a plurality of second invalid depth values among the invalid depth values according to whether the invalid density values are greater than a density threshold (step S504). To be more specific, if the number of the valid depth values around a depth value is too small, the reliability degree will be reduced relatively. Thus, the invalid depth removing module 146 may determine whether the unremoved first valid depth values are the second invalid depth values according to the distribution of the valid depth values. Then, the invalid depth removing module 146 removes the second invalid depth values from the main depth map dm_1, so as to generate the necessary repair depth map including a plurality of second holes among the holes (step S505). Therein, persons with ordinary skills of the art may design the density threshold according to actual demands, and the invention is not intended to limit the density threshold.

Figure 7:
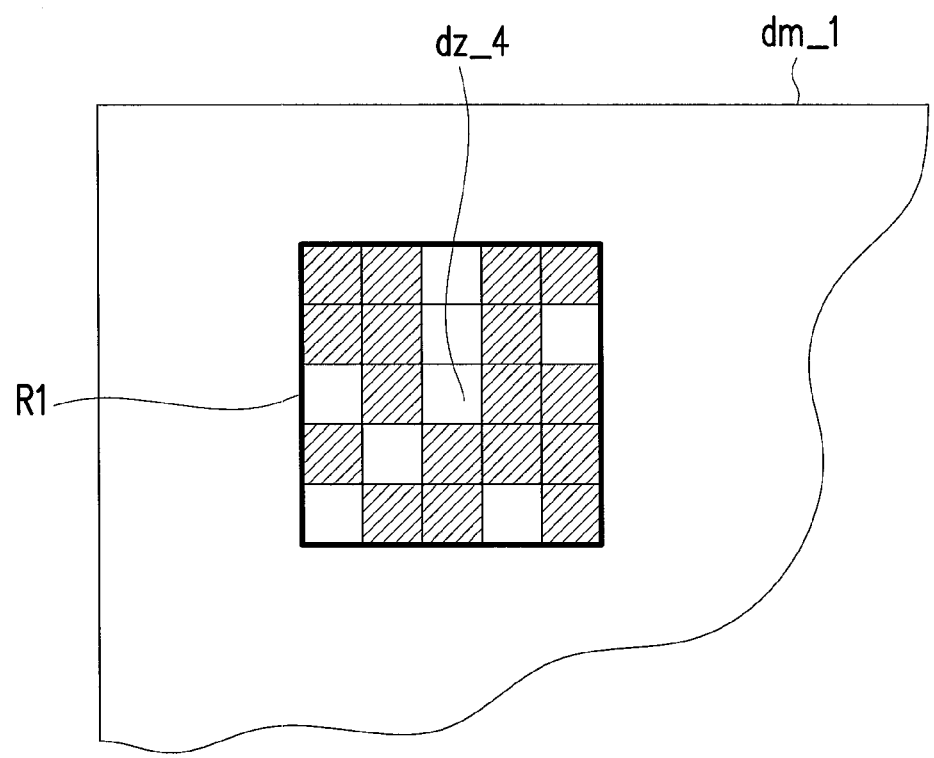
FIG. 7 is a schematic diagram illustrating an example of removing the invalid depth values according to a density according to an embodiment of the invention.
Figure 7:
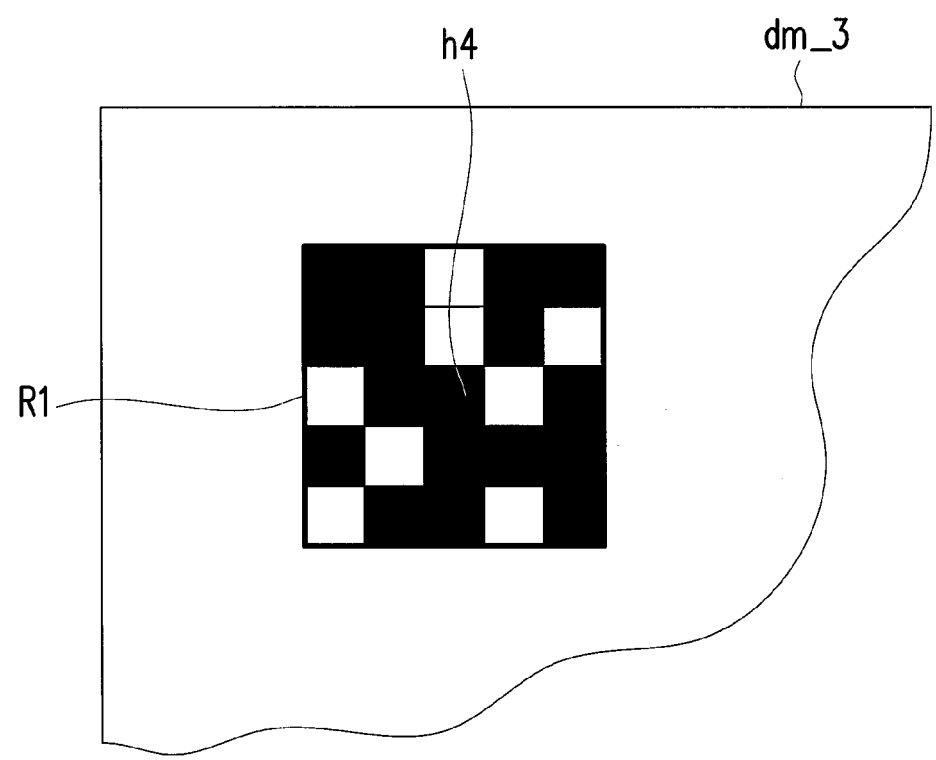

For instance, FIG. 7 is a schematic diagram illustrating an example of removing the invalid depth values according to a density according to an embodiment of the invention. With reference to FIG. 7, in the present example, the main depth map dm_1 includes a depth value dz_4, and the main depth value dz_4 is an unremoved valid depth value. The invalid depth removing module 146 uses the main depth value dz_4 as a center to calculate the number of the invalid depth values within a limited range R1, and the invalid depth removing module 146 calculates an invalid density value associated with the main depth value dz_4 according to the number of the invalid depth values. Referring to the example illustrated in FIG. 7, there are 17 invalid depth values (presented by using slashes) within the limited range R1 having a size of 5×5 pixels, which means that the invalid density value associated with the main depth value dz_4 is high. In other words, the reliability degree of the main depth value dz_4 is low. Accordingly, in the example illustrated in FIG. 7, the invalid depth removing module 146 removes the main depth value dz_4 considered as one second invalid depth value from the main depth map dm_1, so as to generate the necessary repair depth map dm_3 including a hole h4.

Back to the process illustrated in FIG. 5, the invalid depth removing module 146 compares the auxiliary depth map dm_2 with the main depth map dm_1 to remove the main depth values which is not consistent with the corresponding auxiliary depth values thereof from the main depth map dmi, so as to generate the necessary repair depth map dm_3 including a plurality of third holes among the holes (step S506). In particular, the invalid depth removing module 146 may determine the reliability degree of the depth values by cross-comparing the left depth map with the right depth map. If one main depth value on the main depth map dm_1 is inconsistent with the corresponding auxiliary depth value, the main depth value is considered as an invalid depth value.

Generally speaking, in the present embodiment, a first-stage process of removing the invalid depth values is performed on the main depth map by using the segment distribution map and the statistical calculation. Then, a second-stage process of removing the invalid depth values is performed according to the density of the valid depth values. Lastly, a third-stage process of removing the invalid depth values is performed by cross-comparing the main depth map with the auxiliary depth map. After the three stages of processes of removing the invalid depth values, a plurality of invalid depth values with low reliability can be removed from the depth map. After the invalid depth values are removed to generate the necessary repair depth map including the holes, optimized depth values close to a real situation may be generated according to the segment distribution map, so as to generate an optimized depth in the same way in the invention. An embodiment is illustrated below to describe details with respect to a holes filling operation of the holes filling module of the invention.

Figure 8:
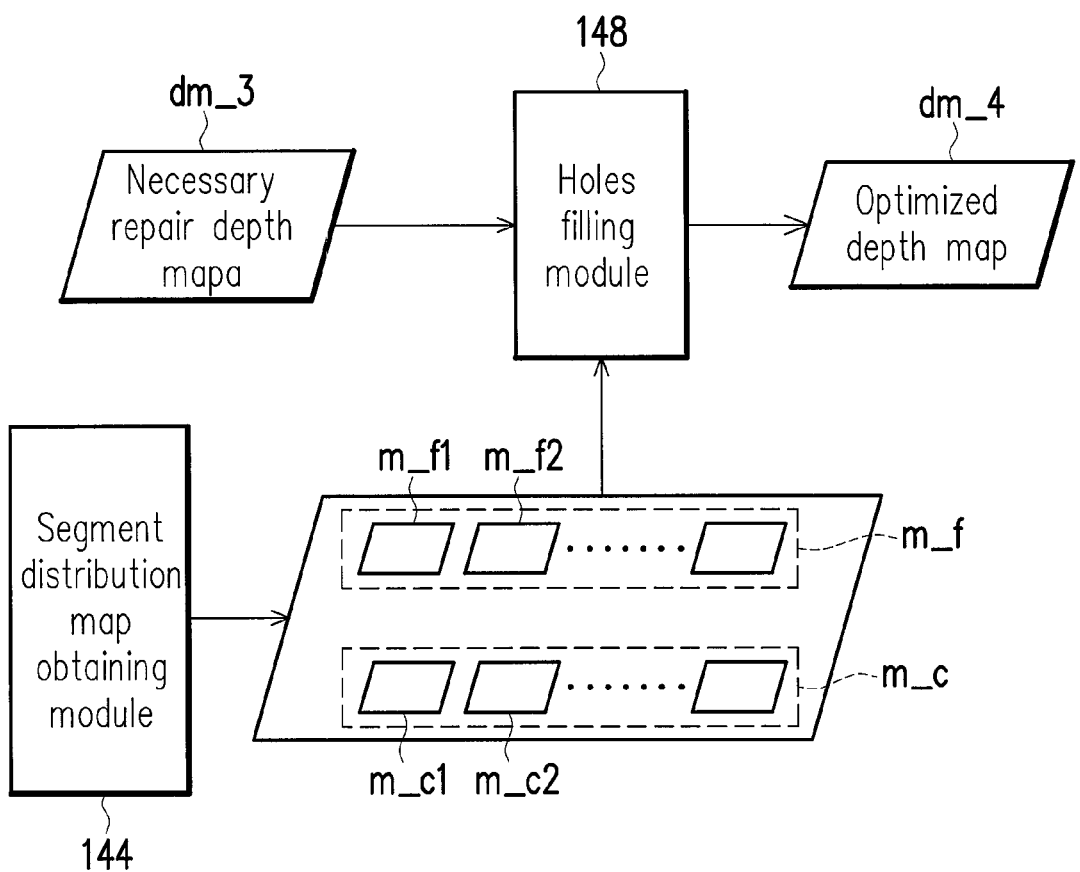
FIG. 8 is a schematic diagram illustrating the operation of filling the necessary repair depth map according to an embodiment of the invention.

FIG. 8 is a schematic diagram illustrating the operation of filling the necessary repair depth map according to an embodiment of the invention. With reference to FIG. 8, the holes filling module 148 fills the necessary repair depth map dm_3 according to the segment distribution map generated by the segment distribution map obtaining module 144, so as to generate the optimized depth map dm_4. It should be mentioned that referring to the example illustrated in FIG. 8, the segment distribution map generated by the segment distribution map obtaining module 144 includes a first segment distribution map group m_f and a second segment distribution map group m_c, and a segmentation fineness corresponding to the first segment distribution map group m_f is different from a segmentation fineness corresponding to the second segment distribution map group m_c.

In brief, based on the descriptions related to FIG. 2 and FIG. 3, the segmentation fineness of the segment distribution map may be determined according to the difference threshold and the size threshold. That is, the segment distribution map obtaining module 144 may generate the first segment distribution map group m_f and the second segment distribution map group m_c which have different segmentation fineness according to the settings of the difference threshold and the size threshold. The first segment distribution map group m_f includes a plurality of first segment distribution maps, and the second segment distribution map group m_c includes a plurality of second segment distribution maps.

Furthermore, in a scenario where the first segment distribution map group m_f has a fixed segmentation fineness based on a set of a difference threshold and a size threshold, the segment distribution map obtaining module 144 may generate a plurality of first segment distribution maps within the first segment distribution map group m_f according to different manners for setting a center datum point. For example, the first segment distribution map group m_f includes first segment distribution maps m_f1 and m_f2. The first segment distribution maps m_f1 and m_f2 correspond to the same segmentation fineness, but have different manners for dividing segments.

Similarly, in a scenario where the second segment distribution map group m_c has a fixed segmentation fineness based on a set of a difference threshold and a size threshold, the segment distribution map obtaining module 144 may generate a plurality of first segment distribution maps within the second segment distribution map group m_c according to different manners for setting a center datum point. For example, the second segment distribution map group m_f includes second segment distribution maps m_c1 and m_c2. The second segment distribution maps m_c1 and m_c2 correspond to the same segmentation fineness, but have different manners for dividing the segments. Accordingly, in an embodiment, the holes filling module 148 may fill the holes on the necessary repair depth map dm_3 according to the segment distribution maps corresponding to different segmentation fineness. On the other hand, the holes filling module 148 may also fill the holes on the necessary repair depth map dm_3 according to the segment distribution maps having different manners for dividing the segments.

Figure 9A:
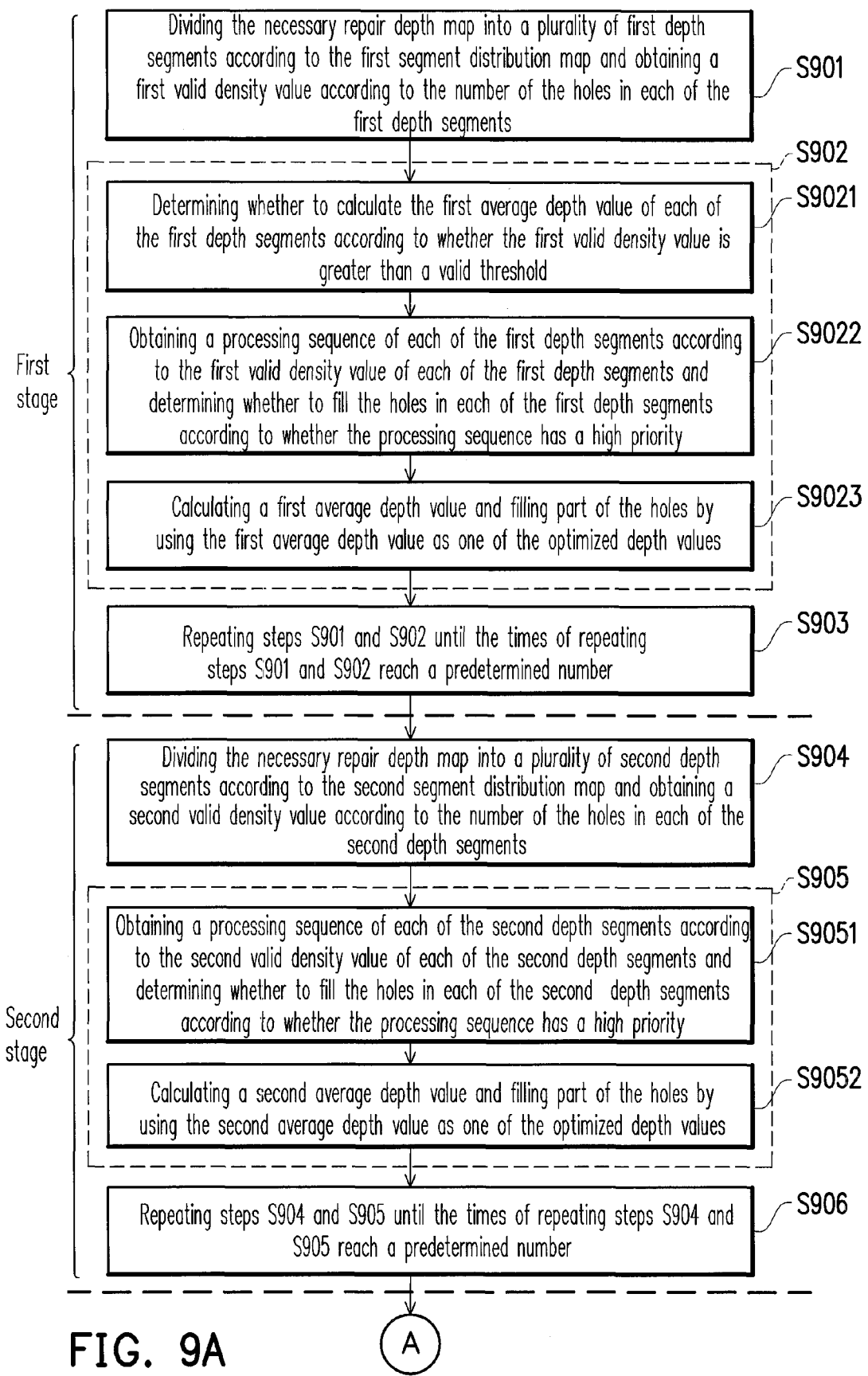
FIG. 9A and FIG. 9B are a flowchart of generating an optimized depth map according to an embodiment of the invention.
Figure 9B:
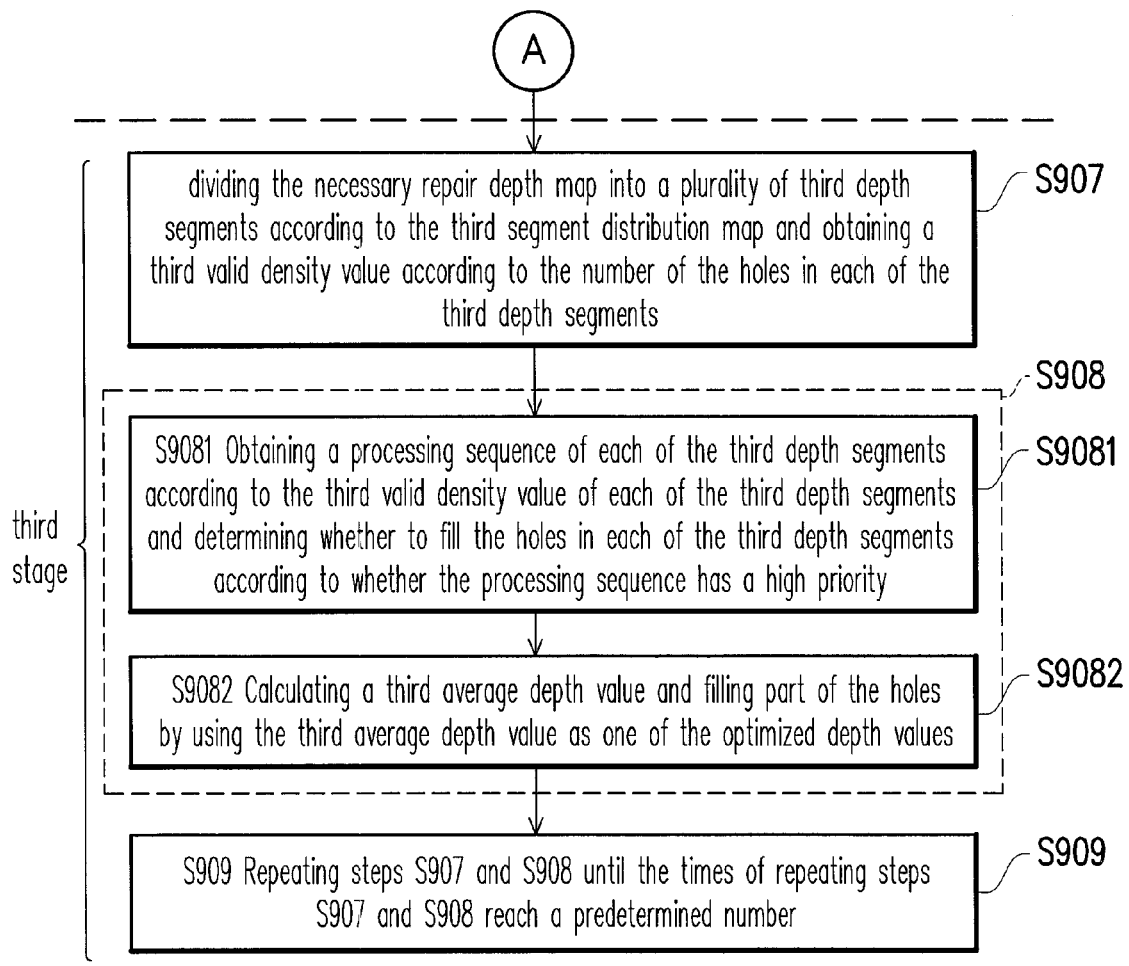

FIG. 9A and FIG. 9B are a flowchart of generating an optimized depth map according to an embodiment of the invention, and detailed steps for generating the optimized depth map of the present embodiment will be described with reference to FIG. 8, FIG. 9A and FIG. 9B. It should be mentioned that in the present embodiment, the holes filling module 148 performs three stages of processes for filling the holes for the necessary repair depth map dm_3. In a first-stage holes filling process, the holes filling module 148 fills the holes by using the first segment distribution map group m_f having a denser dividing manner. In a second-stage holes filling process, the holes filling module 148 fills the holes by using the second segment distribution map group m_c having a rougher dividing manner. Namely, in the present exemplary embodiment, the segmentation fineness of the first segment distribution map group m_f is denser than the segmentation fineness of the second segment distribution map group m_c.

Lastly, in a third-stage holes filling process, the holes filling module 148 fills the holes by using a third segment distribution map group. It is to be mentioned that a segmentation fineness of the third segment distribution map group is even denser than the segmentation fineness of the second segment distribution map group. It is to be mentioned that in an embodiment, the first segment distribution map group m_f may be directly used as the third segment distribution map group in the third stage, but the invention is not limited thereto. In another embodiment, the segmentation fineness corresponding to the third segment distribution map group may be different from the segmentation fineness corresponding to the first segment distribution map group m_f.

With reference to FIG. 8, FIG. 9A and FIG. 9B, the holes filling module 148 divides the necessary repair depth map dm_3 into a plurality of first depth segments according to the first segment distribution map m_f1 and obtains a first valid density value according to the number of the holes in each of the first depth segments (step S901). Accordingly, the depth values within the same first depth segment have a certain degree of relevance, and each depth value within the same first depth segment should be approximate to one another. Thus, the holes filling module 148 determines whether to calculate a first average depth value of each of the first depth segments according to the first valid density value, and fills part of the holes by using the first average depth value as one of the optimized depth values. Namely, in the embodiments of the invention, the holes filling module 148 further determines whether the valid depth values are sufficient in each of the first depth segments according to the valid density values of the first depth segments. In a scenario where the valid depth values are sufficient, the holes filling module 148 may generate the optimized depth values with high reliability.

To be more detailed, step S902 may be divided into sub steps S9021 through S9023. First, the holes filling module 148 determines whether to calculate the first average depth value of each of the first depth segments according to whether the first valid density value is greater than a valid threshold (step S9021). In other words, the holes filling module 148 first filters the first depth segments with low reliability. Then, the holes filling module 148 obtains a processing sequence of each of the first depth segments according to the first valid density value of each of the first depth segments and determines whether to fill the holes in each of the first depth segments according to whether the processing sequence has a high priority (step S9021).

In particular, the holes filling module 148 may calculate the valid density value of each of the first depth segments and sort each of the first depth segments according to high and low of each valid density values. Accordingly, the holes filling module 148 may learn which first depth segments have higher degrees of reliability, so as to generate the optimized depth values based on sufficient valid depth values. For example, after sorting each of the first depth segments according to high and low of each valid density values, the holes filling module 148 first selects the first depth segments having the higher valid depth values according to a predetermined proportion threshold. The predetermined proportion threshold may fall within a range from 10% to 70%, for example, which construes no limitations to the invention. Persons with ordinary skills of the art may determine the proportion threshold depending on actual application situations, which is not limited in the invention. After which first depth segments are selected for filling the holes therein, the holes filling module 148 calculates a first average depth value for the selected first depth segments and fills part of the holes by using the first average depth value as one of the optimized depth values (step S9023).

Accordingly, in the present embodiment, the holes filling module 148 does not fill all the holes in one time, but fills the holes in the area with high reliability first. Therefore, the holes filling module 148 repeats steps S901 and S902 until the times of repeating the preceding two steps reach a predetermined number (step S903). The predetermined number of times may fall within a range from 10 to 100 times, for example, which construes no limitations to the invention. Persons with ordinary skills of the art may determine the number of times depending on actual application situations, which is not limited in the invention.

It should be mentioned that during the process of repeating steps S901 and S902, the holes filling module 148 may also fill the holes according to the plurality of first segment distribution maps having different manners for dividing the segments in the first segment distribution map group m_f. For instance, the holes filling module 148 may fill the holes for the necessary repair depth map dm_3 by sequentially using the first segment distribution maps m_f1 and m_f2, where the first segment distribution maps m_f1 and m_f2 have the same segmentation fineness.

Figure 10:
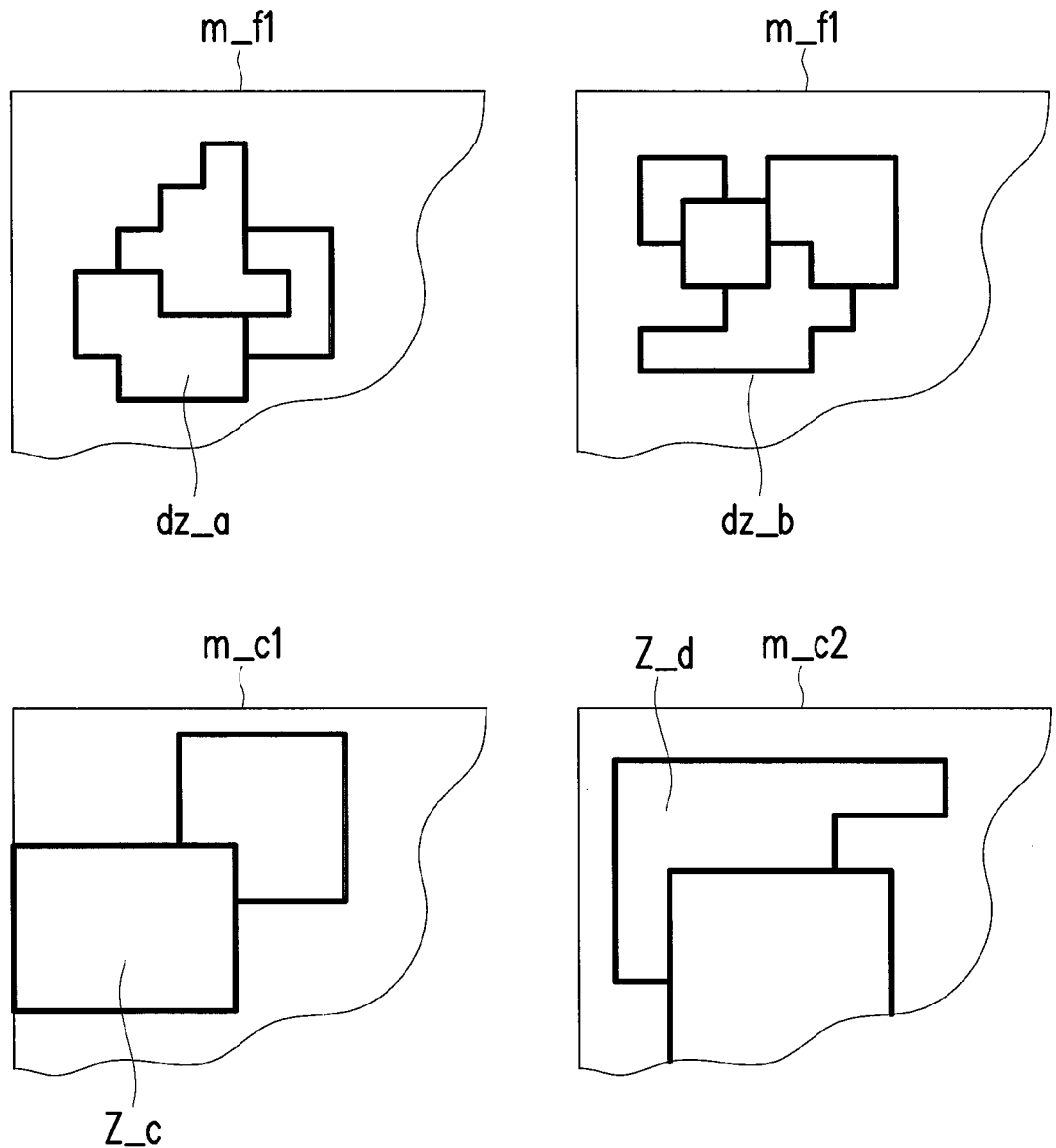
FIG. 10 is a schematic diagram illustrating an example of the segment distribution map according to the embodiment depicted in FIG. 8.

After the first-stage process for filling the holes is completed, the holes filling module 148 fills the holes by using the second segment distribution map group m_c having a rougher segmentation fineness. For instance, FIG. 10 is a schematic diagram illustrating an example of the segment distribution map according to the embodiment depicted in FIG. 8. With reference to FIG. 10, the first segment distribution maps m_f1 and m_f2 of the first segment distribution map group m_f have different manners for dividing the depth segments according to different manners for setting their center datum points, but have the segmentation fineness. In other words, segments dz_a and dz_b have approximate segment sizes, but different segment shapes.

In the same way, the second segment distribution maps m_c1 and m_c2 of the second segment distribution map group m_c have different manners for dividing the depth segments according to different manners for setting their center datum points, but have the segmentation fineness. The segmentation fineness of the first segment distribution map group m_f is denser than the segmentation fineness of the second segment distribution map group m_c. Referring to FIG. 10, the segment size of the relevant segment dz_a on the first segment distribution map m_f1 is smaller than the segment size of the relevant segment dz_b on the second segment distribution map m_c1.

Back to the process illustrated in FIG. 9, the holes filling module 148 divides the necessary repair depth map dm_3 into a plurality of second depth segments according to the second segment distribution map m_c1 and obtains a second valid density value according to the number of the holes in each of the second depth segments (step S904). Similarly, the holes filling module 148 determines whether to calculate a second average depth value of each of the second depth segments according to the second valid density value and fills part of the holes by using the second average depth value as one of the optimized depth values (step S905). It should be mentioned that the second segment distribution map group m_c with a rougher segmentation fineness may be used to fill part of the holes in the necessary repair depth map dm_3 which have unclear textures and weak contour outline information.

Furthermore, step S905 may be divided into sub steps S9051 through S9052. The holes filling module 148 obtains a processing sequence of each of the second depth segments according to the second valid density value of each of the second depth segments and determines whether to fill the holes in each of the second depth segments according to whether the processing sequence has a high priority (step S9051). The holes filling module 148 calculates the second average depth value and fills part of the holes by using the second average depth value as one of the optimized depth values (step S9052). The holes filling module 148 repeats steps S904 and S905 until the times of repeating steps S904 and S905 reaches a predetermined number (step S906). Details with respect to the operation of the holes filling module 148 filling the holes according to the second segment distribution map group m_c is similar to that of filling the holes according to the first segment distribution map group m_f, which can be deduced by persons with ordinary skills of the art based on the above descriptions, and will not be repeated any longer.

After the second-stage process for filling the holes is completed, the holes filling module 148 divides the necessary repair depth map dm_3 into a plurality of third depth segments according to the third segment distribution map and obtains a third valid density value according to the number of the holes in each of the third depth segments (step S907). The holes filling module 148 determines whether to calculate a third average depth value of each of the third depth segments according to the third valid density value and fills part of the holes by using the third average depth value as one of the optimized depth values (step S908).

Sequentially, step S908 may be divided into sub steps S9081 through S9082. The holes filling module 148 obtains a processing sequence of each of the third depth segments according to the third valid density value of each of the third depth segments and determines whether to fill the holes in each of the third depth segments according to whether the processing sequence has a high priority (step S9081). The holes filling module 148 calculates the third average depth value and fills part of the holes by using the third average depth value as one of the optimized depth values (step S9082).

The holes filling module 148 repeats steps S907 and S908 until the times of repeating steps S907 and S908 reach a predetermined number (step S909). Details with respect to the operation of the holes filling module 148 filling the holes according to the third segment distribution map group m_c is similar to that of filling the holes according to the first segment distribution map group m_f, which can be deduced by persons with ordinary skills of the art based on the above descriptions, and will not be repeated any longer. Accordingly, through the three stages of processes for filling the holes, the holes filling module 148 may fill the holes on the necessary repair depth map dm_3 sequentially according to the segment distribution maps corresponding to different segmentation fineness, so as to generate an optimized depth map with a high accuracy.

It is to be mentioned that the depth map generated by performing the 3D depth estimation on the left image and the right image generally have partial unknown areas, e.g., unknown areas may be generated in a left edge or a right edge of the depth map due to insufficient information for generating the depth values. Since the periphery of the unknown areas has not valid depth values, only wrong values can be gotten no matter how to get values from neighboring areas for filling the holes. However, in the invention, the holes are filled according to the segment distribution map and specific filling conditions. Thus, the holes in the areas with the higher reliability may be first filled by using the segment distribution map, so as to generate a good optimized depth map in a way gradually spread from the high reliability. Accordingly, the optimized depth map of the invention leads the unknown areas to a good optimization effect.

To sum up, in the embodiments with respect to the generation of the depth information of the invention, the depth map optimization may be performed on the depth map based on the information provided by the left image and the right image of the original image. Furthermore, in the invention, the original left image or right image is first divided according to the pixel information to generate a segment distribution map including plurality of segments, and the segment distribution map is then used to remove the invalid depth values from the depth map. Thereafter, the holes can be filled by the processes of different stages according to the dividing manners applied to the segments in different sizes, such that the holes in the depth map can be filled by using the optimized depth values generated in different stages. Thereby, not only the invalid depth values with low reliability can be removed from the depth map, but also the holes in the depth map can be filled by using the optimized depth values generated according to information with respect to the periphery of the holes, so as to generate the depth map with less noise and high accuracy.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A method for generating depth information, for an electronic apparatus, the method comprising:
obtaining a left image and a right image captured by a stereoscopic imaging system and performing three-dimensional (3D) depth estimation on the left image and the right image so as to obtain a main depth map associated with one of the left image and the right image and corresponding to a plurality of first pixels, wherein the main depth map records a plurality of main depth values respectively corresponding to the first pixels;
dividing the left image or the right image associated with the main depth map into a plurality of segments according to pixel information of each of the first pixels, so as to obtain a segment distribution map including the segments;
determining whether the main depth values corresponding to the first pixels match a reliable condition according to the segment distribution map and removing a plurality of invalid depth values among the main depth values which do not match the reliable condition from the main depth map, so as to generate a necessary repair depth map including a plurality of holes, comprising:

dividing the main depth map into a plurality of depth segments according to the segment distribution map and performing a statistical calculation on the main depth values in each of the depth segments to obtain a statistical result; and determining whether the main depth values are a plurality of first invalid depth values among the invalid depth values according to the statistical result and removing the first invalid depth values from the main depth map, so as to generate the necessary repair depth map including a plurality of first holes among the holes; and generating a plurality of optimized depth values respectively for the holes in the necessary repair depth map according to the segment distribution map and filling the optimized depth values into the necessary repair depth map to generate an optimized depth map.

2. The method according to claim 1, wherein the step of dividing the left image or the right image associated with the main depth map into the segments according to the pixel information of each of the first pixels so as to obtain the segment distribution map including the segments comprises:

comparing a first adjacent pixel with a second adjacent pixel that are adjacent to each other among the first pixels to determine whether a pixel value difference between the first adjacent pixel and the second adjacent pixel is less than a difference threshold; and if the pixel value difference is less than the difference threshold, connecting the first adjacent pixel with the second adjacent pixel to form a first segment among the segments, wherein the first segment comprises the first adjacent pixel and the second adjacent pixel.

3. The method according to claim 2, wherein the step of dividing the left image or the right image associated with the main depth map into the segments according to the pixel information of each of the first pixels so as to obtain the segment distribution map including the segments comprises:

limiting a segment size of each of the segments according to a size threshold to obtain the segment distribution map, wherein the segment size of each of the segments is not greater than the size threshold.

4. The method according to claim 1, wherein after the step of removing the first invalid depth values from the main depth map so as to generate the necessary repair depth map including the first holes among the holes, the method further comprises:

calculating a plurality of invalid density values of the first invalid depth values within a limited range respectively by using a plurality of first valid depth values which are not the first invalid depth values among the main depth values as centers;

determining whether the first valid depth values are a plurality of second invalid depth values among the invalid depth values respectively according to whether the invalid density values are greater than a density threshold; and removing the second invalid depth values from the main depth map, so as to generate the necessary repair depth map including a plurality of second holes among the holes.

5. The method according to claim 1, further comprising:

performing the 3D depth estimation on the left image and the right image so as to obtain an auxiliary depth map associated with the other of the left image and the right image and corresponding to a plurality of second pixels, wherein the auxiliary depth map records an auxiliary depth value of each of the second pixels; and comparing the main depth map with the auxiliary depth map to remove the main depth values which is not consistent with the corresponding auxiliary depth values thereof from the main depth map, so as to generate the necessary repair depth map including a plurality of third holes among the holes.

6. The method according to claim 3, wherein the segment distribution map has a segmentation fineness according to the difference threshold and the size threshold, the segment distribution map comprises a first segment distribution map and a second segment distribution map, and the segmentation fineness of the first segment distribution map is different from the segmentation fineness of the second segment distribution map.

7. The method according to claim 6, wherein the step of generating the optimized depth values respectively for the holes in the necessary repair depth map according to the segment distribution map and filling the optimized depth values into the necessary repair depth map to generate the optimized depth map comprises:

dividing the necessary repair depth map into a plurality of first depth segments according to the first segment distribution map and obtaining a first valid density value according to the number of the holes in each of the first depth segments;

determining whether to calculate a first average depth value of each of the first depth segments according to the first valid density value and filling part of the holes by using the first average depth value as one of the optimized depth values; and repeating the preceding two steps until the times of repeating the preceding two steps reach a predetermined number.

8. The method according to claim 7, wherein the step of determining whether to calculate the first average depth value of each of the first depth segments according to the first valid density value comprises:

determining whether to calculate the first average depth value of each of the first depth segments according to whether the first valid density value is greater than a valid threshold.

9. The method according to claim 7, wherein the step of determining whether to calculate the first average depth value of each of the first depth segments according to the first valid density value further comprises:

obtaining a processing sequence of each of the first depth segments according to the first valid density value of each of the first depth segments and determining whether to fill the holes in each of the first depth segments according to whether the processing sequence has a high priority.

10. The method according to claim 7, wherein after the step of determining whether to calculate the first average depth value of each of the first depth segments according to the first valid density value and filling part of the holes by using the first average depth value as one of the optimized depth values, the method further comprises:

dividing the necessary repair depth map into a plurality of second depth segments according to the second segment distribution map and obtaining a second valid density value according to the number of the holes in each of the second depth segments; and determining whether to calculate a second average depth value of each of the second depth segments according to the second valid density value and filling part of the holes by using the second average depth value as one of the optimized depth values.

11. An apparatus for generating depth information, comprising:
a storage unit, recording a plurality of modules; and
one or more processing units, coupled with the storage unit to access and execute the modules recorded in the storage unit, wherein the modules comprise:
a depth estimation module, obtaining a left image and a right image captured by a stereoscopic imaging system and performing 3D depth estimation on the left image and the right image so as to obtain a main depth map associated with one of the left image and the right image and corresponding to a plurality of first pixels, wherein the main depth map records a plurality of main depth values respectively corresponding to the first pixels;
a segment distribution map obtaining module, dividing the left image or the right image associated with the main depth map into a plurality of segments according to pixel information of each of the first pixels, so as to obtain a segment distribution map including the segments;
an invalid depth removing module, determining whether the main depth values corresponding to the first pixels match a reliable condition according to the segment distribution map and removing a plurality of invalid depth values among the main depth values which do not match the reliable condition from the main depth map, so as to generate a necessary repair depth map including a plurality of holes, wherein the invalid depth removing module divides the main depth map into a plurality of depth segments according to the segment distribution map, performs a statistical calculation on the main depth values in each of the depth segments to obtain a statistical result, determines whether the main depth values are a plurality of first invalid depth values among the invalid depth values according to the statistical result and removes the first invalid depth values from the main depth map, so as to generate the necessary repair depth map including a plurality of first holes among the holes; and
a holes filling module, generating a plurality of optimized depth values respectively for the holes in the necessary repair depth map according to the segment distribution map and filling the optimized depth values into the necessary repair depth map to generate an optimized depth map.

12. The apparatus according to claim 11, wherein the segment distribution map obtaining module compares a first adjacent pixel with a second adjacent pixel that are adjacent to each other among the first pixels to determine whether a pixel value difference between the first adjacent pixel and the second adjacent pixel is less than a difference threshold,
if the pixel value difference is less than the difference threshold, the segment distribution map obtaining module connects the first adjacent pixel with the second adjacent pixel to form a first segment among the segments, wherein the first segment comprises the first adjacent pixel and the second adjacent pixel.

13. The apparatus according to claim 12, wherein the segment distribution map obtaining module limits a segment size of each of the segments according to a size threshold to obtain the segment distribution map, and the segment size of each of the segments is not greater than the size threshold.

14. The apparatus according to claim 11, wherein the invalid depth removing module further calculates a plurality of invalid density values of the first invalid depth values within a limited range respectively by using a plurality of first valid depth values which are not the first invalid depth values among the main depth values as centers, determines whether the first valid depth values are a plurality of second invalid depth values among the invalid depth values respectively according to whether the invalid density values are greater than a density threshold and removes the second invalid depth values from the main depth map, so as to generate the necessary repair depth map including a plurality of second holes among the holes.

15. The apparatus according to claim 11, wherein the depth estimation module further performs the 3D depth estimation on the left image and the right image so as to obtain an auxiliary depth map associated with the other of the left image and the right image and corresponding to a plurality of second pixels, wherein the auxiliary depth map records an auxiliary depth value of each of the second pixels,
wherein the invalid depth removing module compares the main depth map with the auxiliary depth map to remove the main depth values which is not consistent with the corresponding auxiliary depth values thereof from the main depth map, so as to generate the necessary repair depth map including a plurality of third holes among the holes.

16. The apparatus according to claim 13, wherein the segment distribution map has a segmentation fineness according to the difference threshold and the size threshold, the segment distribution map comprises a first segment distribution map and a second segment distribution map, and the segmentation fineness of the first segment distribution map is different from the segmentation fineness of the second segment distribution map.

17. The apparatus according to claim 16, wherein the holes filling module divides the necessary repair depth map into a plurality of first depth segments according to the first segment distribution map, obtains a first valid density value according to the number of the holes in each of the first depth segments, determines whether to calculate a first average depth value of each of the first depth segments according to the first valid density value and fills part of the holes by using the first average depth value as one of the optimized depth values.

18. The apparatus according to claim 17, wherein the holes filling module determines whether to calculate the first average depth value of each of the first depth segments according to whether the first valid density value is greater than a valid threshold.

19. The apparatus according to claim 17, wherein the holes filling module obtains a processing sequence of each of the first depth segments according to the first valid density value of each of the first depth segments and determining whether to fill the holes in each of the first depth segments according to whether the processing sequence has a high priority.

20. The apparatus according to claim 17, wherein the holes filling module divides the necessary repair depth map into a plurality of second depth segments according to the second segment distribution map, obtains a second valid density value according to the number of the holes in the each of the second depth segments, determines whether to calculate a second average depth value of each of the second depth segments according to the second valid density value and fills part of the holes by using the second average depth value as one of the optimized depth values.

* * * * *